(12) United States Patent
Merli et al.

(10) Patent No.: US 11,568,088 B2
(45) Date of Patent: Jan. 31, 2023

(54) METHOD, PROCESSOR AND DEVICE FOR CHECKING THE INTEGRITY OF USER DATA

(71) Applicant: SIEMENS AKTIENGESELLSCHAFT, Munich (DE)

(72) Inventors: Dominik Merli, Mertingen (DE); Daniel Schneider, Munich (DE)

(73) Assignee: SIEMENS AKTIENGESELLSCHAFT

( * ) Notice: Subject to any disclaimer, the term of this patent is extended or adjusted under 35 U.S.C. 154(b) by 40 days.

(21) Appl. No.: 16/084,251

(22) PCT Filed: Mar. 17, 2017

(86) PCT No.: PCT/EP2017/056403
§ 371 (c)(1),
(2) Date: Sep. 12, 2018

(87) PCT Pub. No.: WO2017/167589
PCT Pub. Date: Oct. 5, 2017

(65) Prior Publication Data
US 2019/0095647 A1 Mar. 28, 2019

(30) Foreign Application Priority Data
Mar. 31, 2016 (DE) .................... 10 2016 205 289.6

(51) Int. Cl.
*G06F 21/64* (2013.01)
*G06F 21/57* (2013.01)
*G06F 21/60* (2013.01)

(52) U.S. Cl.
CPC .............. *G06F 21/64* (2013.01); *G06F 21/57* (2013.01); *G06F 21/604* (2013.01)

(58) Field of Classification Search
CPC .......... G06F 21/62; G06F 21/64; G06F 21/57; G06F 21/604; H04L 67/02
(Continued)

(56) References Cited

U.S. PATENT DOCUMENTS

| 6,044,155 A | 3/2000 | Thomlinson et al. |
| 8,300,811 B2 | 10/2012 | Georgiades et al. |

(Continued)

FOREIGN PATENT DOCUMENTS

| CN | 102214277 A | 10/2011 |
| CN | 103093150 A | 5/2013 |

(Continued)

OTHER PUBLICATIONS

McCune, "Flicker: An execution infrastructure for TCB minimization", 2008, ACM, pp. 315-328 (Year: 2008).*

(Continued)

*Primary Examiner* — Taghi T Arani
*Assistant Examiner* — Gregory A Lane
(74) *Attorney, Agent, or Firm* — Schmeiser, Olsen & Watts LLP (57) ABSTRACT

Provided is a method for checking the integrity of user data by a processor, which includes a method step for a first check value for the user data to be computed during a security-protected mode of operation. The method includes a further method step for the first check value to be stored in a security-protected memory module of the processor during the security protected mode of operation. The method includes a further method step for a second check value for the user data to be computed during a runtime mode. The method includes a further method step for the first check value to be compared with the second check value by the processor during the runtime mode. The method includes a further method step for a piece of control information to be (Continued)

provided by the processor during the runtime mode, wherein the control information includes a result of the comparing.

16 Claims, 3 Drawing Sheets

(58) Field of Classification Search
USPC .......................................................... 726/28
See application file for complete search history.

(56) References Cited

U.S. PATENT DOCUMENTS

| | | | |
|---|---|---|---|
| 8,531,247 B2 | 9/2013 | Dichtl | |
| 8,768,300 B2* | 7/2014 | Wu | H04L 63/0853 455/408 |
| 8,838,982 B2* | 9/2014 | Carlson | H04L 9/3247 713/176 |
| 8,843,761 B2 | 9/2014 | Meyer et al. | |
| 8,892,616 B2 | 11/2014 | Dichtl | |
| 9,147,088 B2 | 9/2015 | Falk et al. | |
| 9,641,515 B2 | 5/2017 | Dichtl et al. | |
| 2006/0059553 A1 | 3/2006 | Morais et al. | |
| 2007/0130470 A1* | 6/2007 | Blom | G06F 21/86 713/181 |
| 2009/0172411 A1* | 7/2009 | Kershaw | G06F 21/53 713/189 |
| 2010/0107249 A1* | 4/2010 | Krig | G06F 21/57 726/22 |
| 2010/0174919 A1* | 7/2010 | Ito | G06F 21/74 713/192 |
| 2013/0156180 A1 | 6/2013 | Hess | |
| 2013/0162038 A1 | 6/2013 | Falk et al. | |
| 2014/0068276 A1 | 3/2014 | Imamoto | |
| 2014/0258736 A1* | 9/2014 | Merchan | G06F 21/62 713/193 |
| 2015/0264080 A1 | 9/2015 | Bußer et al. | |

FOREIGN PATENT DOCUMENTS

| | | |
|---|---|---|
| DE | 102005025325 A1 | 12/2006 |
| EP | 2870565 A1 | 5/2015 |
| EP | 2891102 A1 | 7/2015 |
| EP | 2605445 A1 | 9/2015 |
| EP | 2605445 B1 | 9/2015 |
| GB | 2412763 A | 10/2005 |

OTHER PUBLICATIONS

Eisenbarth Thomas et al: "Reconfigurable Trusted Computing in Hardware", XP055374221, Gefunden im Internet: URL:https://pdfs.semanticscholar.org/3d04/ea80057cdldd4d419154432e7ef84831a86b.pdf, gefunden am May 18, 2017; 2007.

TCG: TPM Main Part 3 Commands, Specification Version 1.2, Level 2 Revision 116, TCG Published, XP055292849, Gefunden im Internet: URL:http://trustedcomputinggroup.org/wp-content/uploads/TPM-Main-Part-3-Commands_v1.2_rev116 01032011.pdf, gefunden am Aug. 2, 2016; 2011.

TCG: "TPM Main Part 1 Design Principles", Specification Version 1.2, Revision 116, TCG Published, XP055292841, Gefunden im Internet: URL:http://trustedcomputinggroup.org/wp-content/uploads/TPM-Main-Part-1-Design-Principles_v1.2_rev116_01032011.pdf, gefunden am Aug. 2, 2016; 2011.

PCT International Search Report dated Jun. 7, 2017 corresponding to PCT International Application No. PCT/EP2017/056403 filed Mar. 17, 2017.

PCT International Search Report in related PCT International Application No. PCT/EP2017/056403 filed Mar. 17, 2017, dated Jun. 7, 2017, 3 pages.

Non-English European Exam Report dated Oct. 12, 2020 for Application No. 17 712 733.9.

Chinese Office Action dated Jun. 1, 2021 for Application No. 20178020422.7.

* cited by examiner

FIG 4

FIG 5

METHOD, PROCESSOR AND DEVICE FOR CHECKING THE INTEGRITY OF USER DATA

CROSS-REFERENCE TO RELATED APPLICATIONS

This application claims priority to PCT Application No. PCT/EP2017/056403, having a filing date of Mar. 17, 2017, based off of German application No. 10 2016 205 289.6 having a filing date of Mar. 31, 2016, the entire contents both of which are hereby incorporated by reference.

FIELD OF TECHNOLOGY

The following relates to a method and a processor for checking the integrity of user data.

BACKGROUND

Embedded systems comprise a combination of hardware and software components which are incorporated into a technical concept. Their purpose is, in particular, to control, regulate or monitor a system. They combine microprocessors, FPGAs, RAM memories, flash memories and various peripherals in one platform. The protection of these devices plays an increasingly important role in being able to guarantee correct operation.

One of the main requirements for this is integrity, i.e. protection against unauthorized manipulation of a device. The integrity of public keys, for example, must be checked in order to ensure that they are verifiably unchanged. Integrity protection is divided into two areas:

1) Integrity protection of data stored in non-volatile form which contain the booting and basic functions of a device. These data can also be manipulated while the device is switched off. Protective methods are secure boot and similar mechanisms.

2) Integrity protection of runtime data which are calculated during the operation of the device and are required for further calculations. These data can be manipulated by an attacker who gains access to the device during runtime.

Document U.S. Pat. Nos. 8,531,247 B2, 8,892,616 B2, 8,300,811 B2, 9,147,088 B2, document EP 2 605 445 B1, document EP 2 870 565 A1, document EP 2 891 102 A1 and document U.S. Pat. No. 8,843,761 B2 are known from the prior art.

SUMMARY

An aspect relates to a method and a processor which allow the integrity of user data to be checked with high security.

According to a first aspect, embodiments of the invention relates to a method for checking the integrity of user data by means of a processor, said method comprising a method step for calculating a first check value over the user data during a security-protected operating mode of the processor. The method comprises a further method step for storing the first check value in a security-protected memory module of the processor during the security-protected operating mode. The method comprises a further method step for calculating a second check value over the user data during a runtime mode. The method comprises a further method step for comparing the first check value with the second check value by means of the processor during the runtime mode. The method comprises a further method step for providing control information by means of the processor during the runtime mode, wherein the control information comprises a result of the comparison.

A "processor" can be understood in connection with the patent application to mean, for example, a machine or an electronic circuit. A processor may, in particular, be an FPGA (Field Programmable Gate Array), an integrated circuit (IC), a central processing unit (CPU), a microprocessor or a microcontroller. A processor can also be understood to mean a virtualized processor, which is also referred to as a soft CPU. It may, for example, also be a programmable processor which is equipped with configuration steps to carry out the method according to embodiments of the invention or is configured with configuration steps in such a way that the programmable processor has the features according to embodiments of the invention of the device, the system or parts of the system.

A "security-protected memory module" can be understood in connection with the patent application to mean, for example, a memory module to which, in particular, the processor has read access. In particular, direct access to the security-protected memory module from outside the processor is prevented. The processor can preferably have write access to the memory module, in particular during a security-protected operating mode, for example a security-protected operating mode of the processor. If data, for example check values, are intended to be stored on the security-protected memory module, these data are transferred to an interface or transmission module of the processor. A control circuit of the processor, for example, which can be configured as a control module, then decides, preferably on the basis of the operating mode, for example the security-protected operating mode or a runtime mode, whether the data can be written to the security-protected memory module or the data of the security-protected memory module can be read.

A "transmission module" can be understood in connection with the patent application to mean, for example, an interface or a bus which is suitable, in particular, for transmitting and/or receiving data. A transmission module can, for example, transmit and/or receive data inside the processor. Alternatively, a transmission module may be an interface or a bus by means of which data are transmitted to the processor and/or are received from the latter.

A "check value" can be understood in connection with the patent application to mean, for example, a hash value, a digital signature and/or a checksum which, for example, has been calculated over user data by means of a function, for example a check value function. A check value function may be a one-way function, in particular a cryptographic hash function, for example a function which implements the Keyed-Hash Message Authentication Code (HMAC) algorithm.

A "security-protected operating mode" can be understood in connection with the patent application to mean, for example, an operating mode during which only trusted functions, for example of an operating system, are preferably carried out. The "security-protected operating mode" may, for example, be a boot phase of a device which, in particular on completion of the boot process, ends the safety-protected operating mode, for example by means of an interrupt or a machine command. However, the security-protected operating mode may also be an operating mode which, for example, can be activated during the manufacture and testing of a device with a processor according to embodiments of the invention. During the security-protected operating mode, only trusted program code, for example, which has been digitally signed by the device manufacturer, for example, can be executed. During the security-protected operating mode, only data inside the device, in particular, are processed and, in particular, communication with other devices or networks is prevented. During the security-protected operating mode, it can be assumed, for example, that program code or user data are not or cannot be manipulated by unauthorized parties.

The activation of the security-protected operating mode can be protected, for example, by means of security mechanisms, for example mechanical switches, particularly in the form of jumpers, cryptographic functions, particularly in the form of digital signatures, digital certificates or passwords.

A "runtime mode" can be understood in connection with the patent application to mean, for example, an operating mode in which an operating system, in particular application code, runs, for example, software components from sources other than the manufacturer. During the runtime mode, it can be assumed, for example, that program code or user data are manipulated by unauthorized parties. The runtime mode and the security-protected operating mode are preferably mutually exclusive. This means, in particular, that the runtime mode cannot be activated during the security-protected operating mode and the security-protected operating mode can be activated during the runtime mode.

"Runtime" can be understood in connection with the patent application to mean, for example, an operating time of a device from the activation of the device until the deactivation of the device. The runtime comprises, for example, a trusted time period during which, in particular, a security-protected operating mode is activated, and a potentially non-trusted time period during which, in particular, the security-protected operating mode is deactivated and during which, in particular, the runtime mode is activated.

"Outside the processor" can be understood in connection with the patent application to mean, for example, that components and/or functions, for example, do not form an integral part of the processor. These components and/or functions can be implemented, for example, by means of software components of an operating system and can, in particular, access the processor and its interface. The processor can preferably be accessed only via its interfaces.

"Inside the processor" can be understood in connection with the patent application to mean, for example, that components and/or functions, for example, form an integral part of the processor. These components and/or functions can be implemented, for example, by means of circuits on the processor, in particular a logic circuit. Components and/or functions inside the processor cannot, in particular, be accessed directly. Access is preferably gained via defined interfaces.

"User data" can be understood in connection with the patent application to mean, for example, program components, configuration information, measurement data and/or control data which can, in particular, also be encrypted.

The method is advantageous, in particular, since the first check value, also referred to as the original check value, can be stored directly in the processor, in particular in an FPGA, for example in memory blocks of the FPGA (known as block RAM), or in flip-flops. It is therefore, in particular, not necessary to transmit the first check value to the operating system during an integrity check.

It can thereby be achieved, for example, that an implementation of a check value function, for example a cryptographic function, particularly in the form of a one-way function, on the processor for calculating the check value, i.e. the first check value and/or the second check value, is avoided. In other words, it is thereby achieved, in particular, that the integrity of the user data can be checked by the processor without managing and/or storing resources on the processor for the check value function for calculating the check value or secret keys on the processor. It is thus possible, in particular, to calculate the first checksum and/or the second checksum outside the processor.

It is, however, also possible, for example, for the check value function for calculating the check value, i.e. the first check value and/or the second check value, to be implemented on the processor. It is thus possible, for example, for the first check value and/or the second value to be calculated by the processor itself, i.e. inside the processor.

The first check value is stored in a method step in the security-protected memory module, in particular following its calculation, as mentioned above. This takes place, in particular, regardless of whether the first check value is calculated inside or outside the processor.

The same applies, in particular, to the second check value, since this can also be calculated inside or outside the processor. The second check value can, if necessary, be transmitted to the processor for comparison.

In a first embodiment of the method, the security-protected memory module is once-writable during a runtime of the processor, or the security-protected memory module is once-writable.

Since the security-protected memory module is once-writable, the first check value, in particular, can be stored preferably in unmodifiable form in the security protected memory module, for example during the security protected operating mode. This may, for example, be once during the runtime of the processor or a device which uses the processor. Alternatively, the security-protected memory module can be written once only, for example during its entire lifetime. In such a case, the first check value, for example, can be stored once, in particular on the security-protected memory module, if the security-protected operating mode is activated, wherein the security-protected operating mode is activated preferably only during the manufacture of the processor or of a device which uses the processor.

In a further embodiment of the method, a secret is additionally stored in the security-protected memory module during the security-protected operating mode.

The method is particularly advantageous for using, for example, additional cryptographic functions and/or security mechanisms with the secret, for example a public cryptographic key and/or a private cryptographic key of an asymmetric cryptographic method and/or a symmetric cryptographic key of a symmetric method. The user data can thus, for example, be encrypted or decrypted.

In a further embodiment of the method, if a sufficient match is established in the comparison of the first check value and the second check value, the secret is additionally provided during the provisioning.

The method is particularly advantageous for providing, for example, a cryptographic key for decrypting the user data. The highest possible cryptographic protection (or security) can thereby be achieved, for example, for the user data.

In a further embodiment of the method, if a sufficient match is established in the comparison of the first check value and the second check value, the secret is used as an input parameter for a cryptographic function.

The method is particularly advantageous for providing, for example, a cryptographic key for decrypting the user data. The highest possible cryptographic protection (or security) can thereby be achieved, for example, for the user data.

In a further embodiment of the method, the second check value is expected for the comparison within a predefined time interval, wherein the predefined time interval is calculated, in particular, by means of a watchdog, wherein the control information is provided if the predefined time interval is exceeded.

The method is advantageous, in particular, in enforcing, for example, a high cryptographic protection of the user data by means of an integrity check within a predefined time interval.

In a further embodiment of the method, the processor calculates the first check value and/or the second check value by means of a check value function implemented inside the processor.

The method is advantageous, in particular, for achieving the highest possible security for the integrity check on the user data.

In a further embodiment of the method, the first check value and/or the second check value is/are calculated with a software component by means of a check value function implemented outside the processor.

The method is advantageous, in particular, for achieving the highest possible security and a flexible implementation of the integrity check on the user data. In particular, in the implementation of the processor, a check value function does not need to be implemented inside the processor. As a result, a wide variety of different check value functions, for example, or different cryptographic functions can be used.

According to a further aspect, embodiments of the invention relates to a processor for checking the integrity of user data. The processor comprises a security-protected memory module for storing a first check value during a security-protected operating mode. In addition, the processor comprises a comparison module for comparing the first check value with a second check value during a runtime mode. In addition, the processor comprises a provisioning module to provide control information during the runtime mode, wherein the control information comprises a result of the comparison.

In a first embodiment of the processor, the processor comprises a first transmission module for transmitting the first check value during the security-protected operating mode and/or for transmitting the second check value during the runtime mode.

In a further embodiment of the processor, the security-protected operating mode and/or the runtime mode is/are an operating mode of the processor and/or of a device which has the processor.

According to a further aspect, embodiments of the invention relates to a device for checking the integrity of user data. The device comprises a processor, in particular a processor according to embodiments of the invention, as described above. The processor comprises a security-protected memory module for storing a first check value during a security-protected operating mode. In addition, the processor comprises a comparison module for comparing the first check value with a second check value during a runtime mode. In addition, the processor comprises a provisioning module to provide control information during the runtime mode, wherein the control information comprises a result of the comparison. The device additionally comprises a first calculation module for calculating the first check value over the user data during the security-protected operating mode. The device additionally comprises a second calculation module for calculating a second check value over the user data during the runtime mode.

In a first embodiment of the device, the security-protected operating mode and/or the runtime mode is/are an operating mode of the processor and/or of the device.

In a further embodiment of the device, the device comprises a second transmission module for transmitting the first check value to the processor during the security-protected operating mode and/or a third transmission module for transmitting the second check value to the processor during the runtime mode.

In a further embodiment of the device, the device comprises a processing module for processing the control information of the processor.

A computer program product (non-transitory computer readable storage medium having instructions, which when executed by a processor, perform actions) with program commands to carry out said method according to embodiments of the invention is furthermore claimed.

A variant of the computer program product with program commands for configuring a creation device, for example a 3D printer or a device suitable for creating processors/devices, is additionally claimed, wherein the creation device is configured with the program commands in such a way that said processor according to embodiments of the invention or the device according to embodiments of the invention is created.

A provisioning apparatus for storing and/or providing the computer program product is additionally claimed. The provisioning apparatus is, for example, a data medium which stores and/or provides the computer program product. Alternatively, and/or additionally, the provisioning apparatus is, for example, a network service, a computer system, a server system, in particular a distributed computer system, a cloud-based computer system and/or a virtual computer system which stores and/or provides the computer program product, preferably in the form of a data stream.

This provisioning is carried out, for example, as a download in the form of a program data block and/or command data block, preferably as a file, in particular as a download file, or as a data stream, in particular as a download data stream, of the complete program product. However, this provisioning can also be carried out, for example, as a partial download which consists or comprises of a plurality of parts and, in particular, is downloaded via a peer-to-peer network or is provided as a data stream. A computer program product of this type is loaded into a system, for example using the provisioning apparatus in the form of the data medium, and executes the program commands so that the method according to embodiments of the invention is carried out on a computer or configures the creation device in such a way that said creation device creates the processor according to embodiments of the invention or the device according to embodiments of the invention.

BRIEF DESCRIPTION

Some of the embodiments will be described in detail, with references to the following figures, wherein like designations denote like members, wherein.

DETAILED DESCRIPTION

Figure 1:
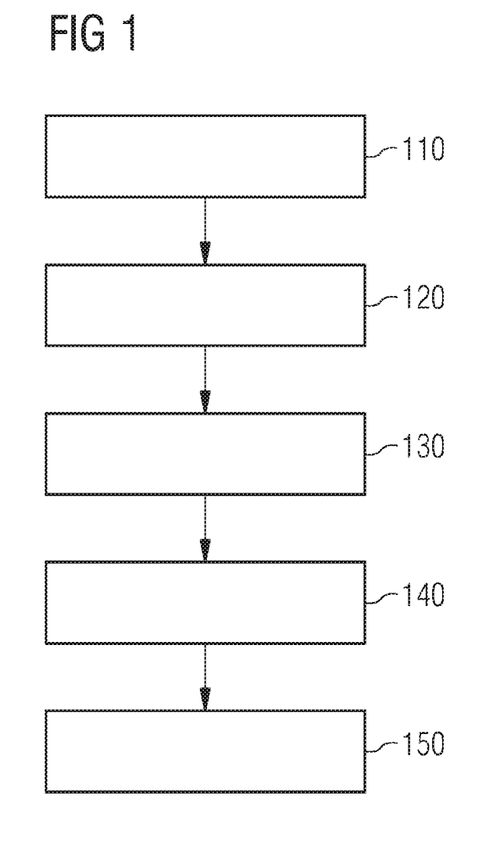
FIG. 1 shows a flow diagram of a first example embodiment of the disclosed method.

FIG. 1 shows a flow diagram of a first example embodiment of the disclosed method.

The method is capable of carrying out an integrity check on user data by means of a processor of a device. In other words, the method can check the integrity of data or user data by means of a check value function, for example a hash function. The check value function calculates, in particular, a check value with a fixed, predefined length, in particular from user data, for example from a message of any given length.

To do this, in a first method step 110, a first check value is calculated over the user data during a security-protected operating mode. In other words, a check value, for example a hash value, is calculated over the user data, for example a message, at a first time, which is also referred to as the security-protected operating mode. The first check value can also be referred to as the original value or reference value.

In a second method step 120, the first check value is stored in a security-protected memory module of the processor during the security-protected operating mode.

The security-protected operating mode is either ended immediately after the storage of the first check value or, if necessary, further functions are first carried out before the security-protected operating mode is ended.

Following the end of the security-protected operating mode, the runtime mode is activated. In order to check the integrity of the user data during the runtime mode, a second check value is calculated over the user data during the runtime mode in a third method step.

The second check value is transmitted to the processor so that the processor can compare the first check value and the second check value in a fourth method step. Alternatively, the necessary information, for example the user data or the memory address of the user data, can be transmitted to the processor so that the processor itself can perform the calculation of the second check value, and then carries out the comparison of the first check value with the second check value.

In other words, the integrity of the user data is checked within the processor during the runtime mode.

Once the comparison of the first check value with the second check value has been carried out, the processor provides control information during the runtime mode in a fifth method step 150, wherein the control information comprises a result of the comparison.

The first checksum and the second checksum should preferably be identical so that the processor can confirm the integrity of the user data. However, if an insufficient match between the first checksum and the second checksum is identified, the processor can, for example, deactivate functions of the processor or the device with the control information.

In other words, at a later time, also referred to as the runtime mode, the second check value is calculated over the user data current at this time. The determined second check value is compared with the previously determined check value. In the event of a sufficient match, the user data have not changed and the integrity of the user data is ensured. Through the use of a check value function, for example a hash function, the user data of any length do not have to be compared and stored, but only the shorter check value, in particular the first check value. The secure storage of the first check value in the processor plays a decisive role here.

Access to security-related data, for example the first check value, by the components outside the processor, for example software components, can be avoided, for example through an implementation of the method by means of FPGAs in embedded systems.

With the method, it is possible to store the first checksum, secure from manipulation, directly on the processor. This can preferably take place once per runtime for each security-protected memory module of the processor. During an integrity check, the current check value, for example the second check value, is transferred to the processor and compared with the stored first check value. Integrity is ensured if the values match one another.

If the check values do not match one another, the data have been changed. The processor reports this result, for example, to system software of the device which can then, for example, stop the execution of the program.

The SHA256 method or the SHA 3 method, for example, can be used as the check value function.

In one variant, one security-protected memory module for a multiplicity of first check values is implemented on the processor, e.g. on the basis of block RAMs or flip-flops.

In a further variant, the comparison is implemented by means of a comparison module, for example a comparator, in order to compare the first check value with the second check value.

In a further variant, the control module decides whether a check value is to be stored or compared. The control module can, for example, also activate and/or deactivate the security-protected operating mode or the runtime mode.

Once a first check value has been stored in the security-protected memory module, it can preferably not be overwritten until the device is deactivated, but can then be used only for the comparison.

In a further variant, a secret is stored in the security-protected memory module in addition to the first check value. This can be implemented, for example, as a parameter transfer to the processor by a software component outside the processor which discards the secret following the transfer to the processor. If a match between the second check value and the first value is subsequently identified by the processor, the processor returns the previously stored secret.

Alternatively, in the case of a correct second check value, the secret is used for a cryptographic function, for example a digital signature or an encryption function.

In a further variant, a watchdog is additionally implemented in the processor, i.e. a function which expects a correct second check value to be supplied for each stored first check value after a predefined number of time units at the latest.

If this is not the case, the control information could deactivate other modules or functions of the processor or the device, for example the network communication, via an Ethernet network and/or interfaces and/or cryptographic functions and/or the main processor.

In a further variant, the processor implements a check value function to calculate the first check value and/or the second check value. The check value function can actively load user data from the main memory and calculate the first check value and/or the second check value over these user data. The memory address, for example, and the number of bytes to be checked during the security-protected operating mode are transferred to the processor for this purpose. The processor can then itself calculate the first check value preferably during the security-protected operating mode and store it in the security-protected memory module.

If the second check value is to be calculated, an instruction is transmitted to the processor indicating that it should itself independently calculate the second check value. The processor calculates the second check value using the memory address and the number of bytes during the runtime mode and compares the first check value with the second check value.

Alternatively, the processor can independently calculate the second checksum over the user data on a regular basis, in particular within a predefined or predefinable time interval in runtime mode, and can then compare it with the first check value.

Figure 2:
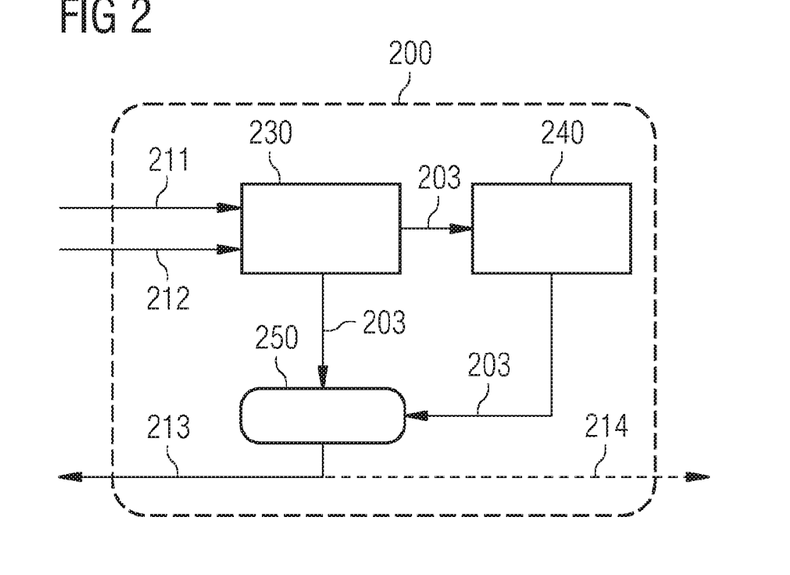
FIG. 2 shows a processor of a second example embodiment which implements the disclosed method.

FIG. 2 shows a processor 200 of a second example embodiment which implements the disclosed method.

The processor 200 comprises a first interface 211 for input, a second interface 212 for command inputs, a third interface 213 to provide control information, in particular with a result of a comparison, an optional fourth interface 214 to provide control information, in particular information for activating and deactivating functions of the processor or the device in which the processor is installed, a control module 20, a security-protected memory module 240 and a comparison module 250. The control module 230, the security-protected memory module 240 and the comparison module 250 are interconnected by means of a communication link via a first bus inside the processor.

The first interface 211, the second interface 212, the third interface 213 and the fourth interface 214 can also be configured as an integral interface or can be configured as two or three interfaces, depending on functional requirements.

The security-protected memory module 240 stores a first check value during a security-protected operating mode.

The comparison module 250 compares the first check value with a second check value during a runtime mode.

Control information is provided via a provisioning module during the runtime mode, wherein the control information comprises a result of the comparison.

The provisioning module may, for example, be the control module 230 or may be formed from the control module 230 and the third interface 213 and/or the fourth interface 214.

The first interface 211 serves, for example, to input user data information relating to the user data. The user data information may comprise, for example, the user data themselves and/or a memory address at which the user data are stored, and/or the number of bytes (i.e. a size indication) of the user data so that the user data can be read from the memory address.

The second interface 212 serves, for example, for command input. A command input may comprise, for example, an instruction to store a check value, for example the first check value, in the security-protected memory module. A command input may also be an instruction to calculate the first check value and/or the second check value and/or an instruction to carry out the comparison of the first check value with the second check value.

The third interface 213 and the optional fourth interface 214 serve to provide the control information. Depending on the implementation, the result of the comparison of the first check value with the second check value can be provided via the third interface 213. Functions, for example, of the processor and/or of a device which comprises the processor can be deactivated via the optional fourth interface 214 by means of the control information. To do this, the control information may comprise, for example, information which blocks or releases corresponding functions.

In other words, FIG. 2 shows an implementation of the method which is described in FIG. 1 in the form of a processor, for example an FPGA. A first check value is initially calculated from any data or user data at a trusted time, referred to here as the security-protected operating mode, and is sent to the processor.

The first check value is stored in the security-protected memory module (e.g. block RAM) through the transmission of a load command to the second interface. This is preferably permitted only once for each memory space on the memory module during the runtime of the processor or the device. At a later time, the second checksum can be recalculated at any time and its integrity can be checked by the processor. The current check value, also referred to as the second check value, is sent to the processor and a command to compare the first checksum with the second checksum is transmitted, preferably via the second interface, to the processor. The processor loads the corresponding first check value and compares it by means of a comparator with the second check value. In the event of a sufficient match, integrity is guaranteed and control information which confirms the correctness of the second checksum is provided.

In the event of an insufficient match of the check values, the data or user data and correspondingly their check value have been changed. The result of the comparison can optionally be used to activate or deactivate functions, other processors, modules of the device which comprises the processor, or a combination hereof.

Figure 3:
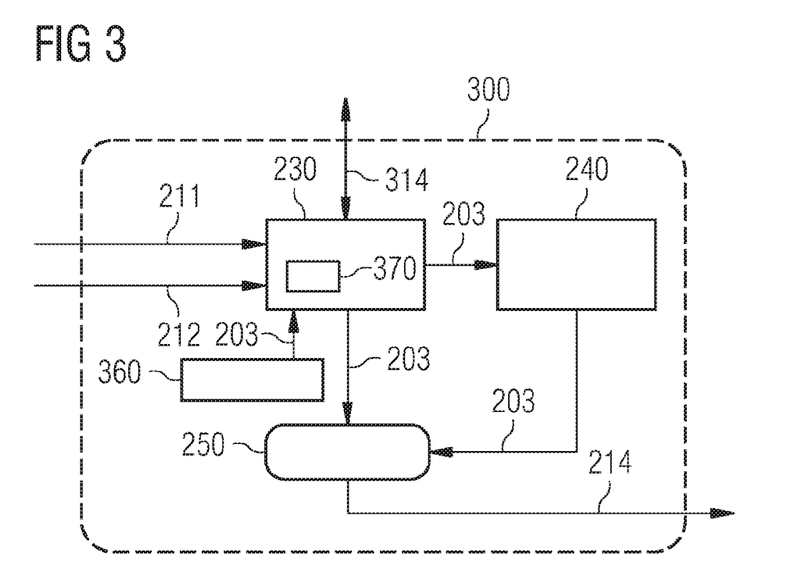
FIG. 3 shows a processor of a third example embodiment which implements the disclosed method.

FIG. 3 shows a processor 300 of a second example embodiment which implements the disclosed method.

The processor 300 is a variant of the processor shown in FIG. 2. Correspondingly, the descriptions relating to features, their mode of operation and the technical effect apply accordingly to FIG. 3.

In addition to the known features from FIG. 2, the processor 300 comprises a fifth interface 314, a watchdog 360 and a calculation module 370 inside the processor which may be configured as an integral calculation module for a first calculation module and/or a second calculation module. The calculation module 370 may, for example, form an integral part of the control module 230.

The processor initially transfers, via the first interface 211, an address in the memory and a number of bytes which indicate the user data and the size of the user data. The first check value is then calculated by means of the calculation module 370 for the user data and is stored in the security-protected memory module 240. From this time on, the watchdog 360 regularly initiates the checking of the user data with the calculation of the second check value and the comparison of the first check value with the second check value.

In the event of an insufficient match of the check values, the data or user data and correspondingly their check value have been changed. The result of the comparison can optionally be used to activate or deactivate functions, other processors, modules of the device which comprises the processor, or a combination hereof.

Figure 4:
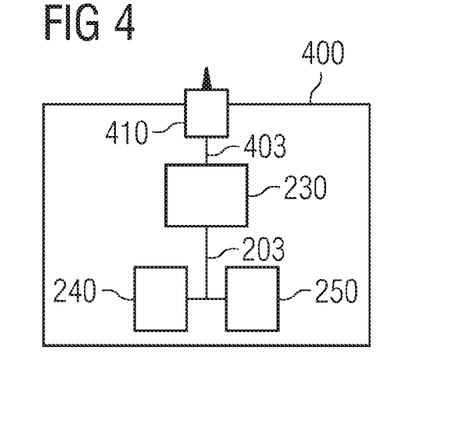
FIG. 4 shows a processor of a fourth example embodiment which implements the disclosed method.

FIG. 4 shows a processor 400 of a second example embodiment which implements the disclosed method.

The processor 400 is a variant of the processor shown in FIGS. 2 and/or 3. Correspondingly, the descriptions of features, their mode of operation and the technical effect apply accordingly to FIG. 4.

The processor 400 comprises a sixth interface 410 which forms an integral interface of the first interface and/or the second interface and/or the third interface and/or the fourth interface and/or the fifth interface.

The sixth interface 410 either forms part of the control module 230 or is connected via a second internal bus to the control module 230.

The control module 230, the comparison module 250 and the security-protected memory module 240 have a communication connection by means of the first bus inside the processor.

As already explained in the preceding example embodiments, the provisioning device is formed by the control module 230 and/or the sixth interface 410.

Figure 5:
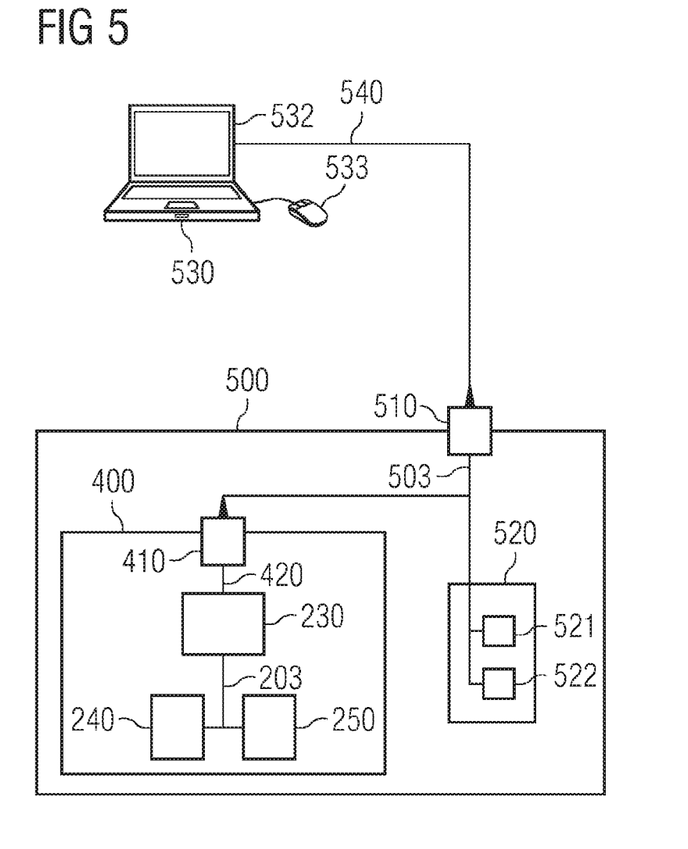
FIG. 5 shows a device of a fifth example embodiment with a processor which implements the disclosed method.

FIG. 5 shows a device 500 of an example embodiment which comprises one of the previously described processors, i.e. a processor which implements the method according to embodiments of the invention. The device 500 may, for example, be a field device or a measuring device.

The device 500 comprises a processor 400 and a calculation module 520 which, in particular, forms an integral calculation module from a first calculation module 521 and a second calculation module 522. The calculation module 520 has a communication connection via a third bus 503 to the sixth interface 410 of the processor 400.

In this example embodiment, the first check value over the user data is checked by the device during the boot phase by means of the calculation module 520, in particular the first calculation module 521, and is transmitted to the processor with the corresponding commands to store the first check value in the security-protected memory module 240.

Once the device has completed the boot phase and is in runtime mode, the integrity of the user data can be checked by means of the processor 400. To do this, the calculation module 520, in particular the second calculation module 522, forms the second check value and transmits it with the corresponding commands to the processor 400, so that the latter carries out the comparison of the second checksum with the first checksum and provides the control information with the result of the comparison to the device via the sixth interface 410.

In addition, the device may comprise a seventh interface 510 with which the device is connected, for example via a network 540, for example an Ethernet, to a workstation 530. This workstation may comprise a display device 532, for example a monitor, and input devices, for example a keyboard and a computer mouse 533.

If, for example, it is established by the processor 400 that the second check value has an insufficient match with the first check value, the processor can send a message to the workstation and preferably deactivate the device.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for checking the integrity of encrypted user data by means of a processor, comprising:
   calculating, by the processor, a first check value over the encrypted user data during a security-protected operating mode;
   storing the first check value in a security-protected memory module of the processor during the security-protected operating mode;
   calculating, by the processor, a second check value over the encrypted user data during a runtime mode;
   comparing the first check value with the second check value by the processor during the runtime mode; and
   providing control information by the processor during the runtime mode, wherein the control information comprises a result of the comparison, further wherein the control information blocks or releases functions of at least one of the processor and a device including the processor based on the result of the comparison;
   wherein at least one of the security-protected operating mode and the runtime mode is an operating mode of the processor or the device including the processor and wherein the security-protected operating mode and the runtime mode are mutually exclusive.

2. The method as claimed in claim 1, wherein the security-protected memory module is once-writable during a runtime of the processor, or the security-protected memory module is once-writable.

3. The method as claimed in claim 1, wherein a secret is additionally stored in the security-protected memory module during the security-protected operating mode.

4. The method as claimed in claim 3, wherein, if a sufficient match is established in the comparison of the first check value and the second check value, the secret is additionally provided during the provisioning.

5. The method as claimed in claim 3, wherein, if a sufficient match is established in the comparison of the first check value and the second check value, the secret is used as an input parameter for a cryptographic function.

6. The method as claimed in claim 1, wherein the second check value is expected for the comparison within a predefined time interval, wherein the predefined time interval is calculated, in particular, by a watchdog, wherein the control information is provided if the predefined time interval is exceeded.

7. The method as claimed in claim 1, wherein the processor calculates the first check value and/or the second check value by a check value function implemented inside the processor.

8. The method as claimed in claim 1, wherein the first check value and/or the second check value is/are calculated with a software component by a check value function implemented outside the processor.

9. A processor for checking the integrity of encrypted user data, having:
   a calculation module for calculating a first check value over the encrypted user data;
   a security-protected memory module for storing the first check value over the encrypted user data during a security-protected operating mode;
   a comparison module for comparing the first check value with a second check value over the encrypted user data during a runtime mode;
   a provisioning module to provide control information during the runtime mode, wherein the control information comprises a result of the comparison, further wherein the control information blocks or releases functions of at least one of the processor and a device including the processor based on the result of the comparison;
   wherein at least one of the security-protected operating mode and the runtime mode is an operating mode of the processor or the device including the processor and wherein the security-protected operating mode and the runtime mode are mutually exclusive.

10. The processor as claimed in claim 9, wherein the processor comprises a first transmission module for transmitting the first check value during the security-protected operating mode and/or for transmitting the second check value during the runtime mode.

11. A device for checking the integrity of encrypted user data, having:
  a processor, comprising:
  a calculation module for calculating a first check value over the encrypted user data;
  a security-protected memory module for storing the first check value over the encrypted user data during a security-protected operating mode;
  a comparison module for comparing the first check value with a second check value over the encrypted user data during a runtime mode;
  a provisioning module to provide control information during the runtime mode, wherein the control information comprises a result of the comparison, further wherein the control information blocks or releases functions of at least one of the processor and the device based on the result of the comparison;
  a first calculation module for calculating the first check value over the user data during the security-protected operating mode; and
  a second calculation module for calculating the second check value over the user data during the runtime mode;
wherein at least one of the security-protected operating mode and the runtime mode is an operating mode of the processor or the device including the processor and wherein the security-protected operating mode and the runtime mode are mutually exclusive.

12. The device as claimed in claim 11, wherein the device comprises a second transmission module for transmitting the first check value to the processor during the security-protected operating mode and/or a third transmission module for transmitting the second check value to the processor during the runtime mode.

13. The device as claimed in claim 11, wherein the device comprises a processing module for processing the control information of the processor.

14. A computer program product, comprising a computer readable hardware storage device having computer readable program code stored therein, said program code executable by a processor of a computer system to implement a method with program commands to carry out the method as claimed in claim 1.

15. A computer program product, comprising a computer readable hardware storage device having computer readable program code stored therein, said program code executable by a processor of a computer system to implement a method with program commands for a creation device which is configured by the program commands to create the processor as claimed in claim 9.

16. A provisioning apparatus for a computer program product, comprising a computer readable hardware storage device having computer readable program code stored therein, said program code executable by a processor of a computer system to implement a method as claimed in claim 14, wherein the provisioning apparatus stores and/or provides the computer program product.

\* \* \* \* \*